United States Patent [19]

Fraden

[11] Patent Number: 5,178,464

[45] Date of Patent: Jan. 12, 1993

[54] BALANCE INFRARED THERMOMETER AND METHOD FOR MEASURING TEMPERATURE

[75] Inventor: Jacob Fraden, La Jolla, Calif.

[73] Assignee: Thermoscan Inc., San Diego, Calif.

[21] Appl. No.: 687,651

[22] Filed: Apr. 19, 1991

[51] Int. Cl.⁵ .................................................. G01J 5/16
[52] U.S. Cl. ........................................ 374/129; 374/2; 374/121; 250/338.1
[58] Field of Search .................. 374/1, 2, 10, 120, 121, 374/129, 130, 131, 133; 250/338.1, 338.3, 346, 349

[56] References Cited

U.S. PATENT DOCUMENTS

| | | | |
|---|---|---|---|
| 2,710,550 | 6/1955 | Heitmuller et al. | 374/130 X |
| 3,023,398 | 2/1962 | Siegert | 340/51 |
| 3,694,624 | 9/1972 | Buchta | 374/2 X |
| 3,768,059 | 10/1973 | Day | 374/133 |
| 4,005,605 | 2/1977 | Michael | 73/355 |
| 4,315,430 | 2/1982 | Szonntagh | 374/126 X |
| 4,435,092 | 3/1984 | Iuchi | 374/129 |
| 4,602,642 | 7/1986 | O'Hara et al. | 128/664 |
| 4,634,294 | 1/1987 | Christol et al. | 374/170 |
| 4,741,626 | 5/1988 | Hashimoto | 374/133 |
| 4,751,388 | 6/1988 | Meixner et al. | 250/338.3 |
| 4,797,840 | 1/1989 | Fraden | 364/557 |
| 4,853,538 | 8/1989 | Jackson | 250/349 X |
| 4,854,730 | 8/1989 | Fraden | 374/164 |
| 4,900,162 | 2/1990 | Beckman et al. | 374/2 X |
| 4,932,789 | 6/1990 | Egawa et al. | 374/129 X |
| 4,969,748 | 11/1990 | Crowley et al. | 374/2 X |

Primary Examiner—William A. Cuchlinski, Jr.
Assistant Examiner—G. Bradley Bennett
Attorney, Agent, or Firm—Robert A. Seemann

[57] ABSTRACT

A sensor includes two thermal energy detectors thermally insulated from one another. The first detector is warmed or cooled by radiation between it and the object being measured. The second detector is warmed or cooled by exchange of thermal energy with a thermal reference source until the second detector reaches a temperature that is a predetermined ratio with that of the first detector. A control circuit which receives signals from the detectors that represent their temperatures, provides control for the thermal reference. A third detector measures the temperature of the thermal reference source and provides a signal representative of the temperature of the reference source. A processor receives the signal from the third detector and provides a signal indicative of the temperature of the object.

6 Claims, 1 Drawing Sheet

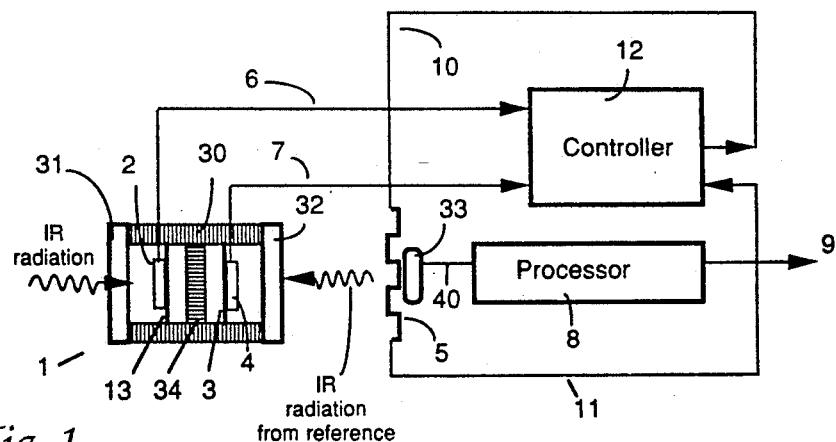
Fig. 1
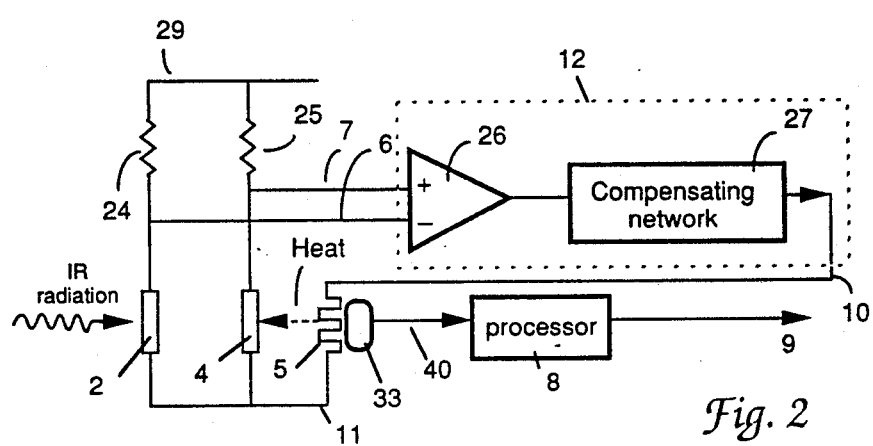
Fig. 2
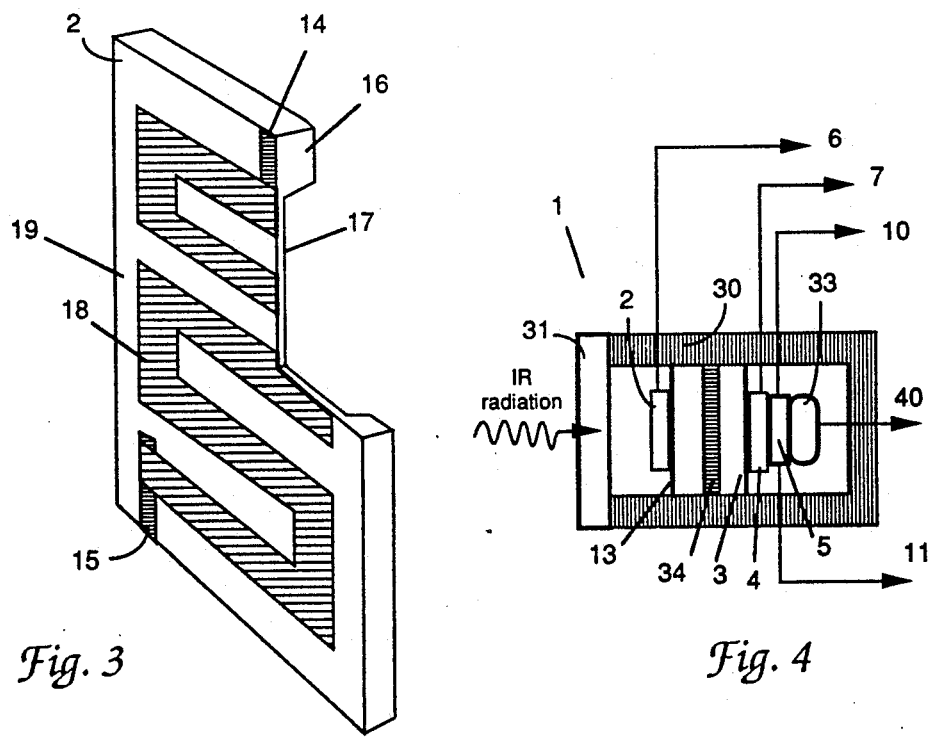
Fig. 3
Fig. 4

BALANCE INFRARED THERMOMETER AND METHOD FOR MEASURING TEMPERATURE

BACKGROUND OF THE INVENTION

1. Field of the Invention

This invention relates generally to thermometry and more specifically, to an infrared radiation thermometer.

2. Description of the Prior Art

The temperature of an object, such as human body, can be determined by two methods: either by a contact thermometer having a probe which comes into physical contact with the measured object, or by a non-contact thermometer which measures infrared (IR) radiation exchange between its radiation detector and an object (target). This invention relates to the latter method.

Variations in internal temperature of an infrared thermometer affect its accuracy and must always be taken into account when the temperature of an object is measured.

One method to reduce variation in measurement is to maintain the thermometer's interior temperature constant by use of a thermostat as described in U.S. Pat. No. 4,602,642 issued to O'Hara et al.

Another method is to control the temperature of the sensor's surface, maintaining it at a predetermined level as in U.S. Pat. No. 4,854,730 issued to Fraden.

Still another method is to control temperature of the sensor's housing at a level which brings the thermal detector output signal essentially to zero level as in U.S. Pat. No. 4,900,162 issued to Beckman et al. The above mentioned U.S. Pat. No. 4,854,730 issued to Fraden and U.S. Pat. No. 4,634,294 issued to Christo et al. teach compensation for ambient temperature variations by using an additional ambient temperature sensor, the signal of which is used for calculation of the correction.

There is another method of compensating for ambient temperature variations by using a symmetrical sensor design, where one thermal detector is exposed to infrared radiation and the other thermal detector is shielded from it. Such an approach is described in U.S. Pat. No. 3,023,398 issued to Siegert. An obvious advantage of this approach is mutual compensation for many instabilities, such as thermal drifts, aging, etc. On the other hand, a symmetrical sensor cannot compensate for instabilities in its components which are related only to the IR radiation, such as optical filters, windows or mirrors. Another problem is that the generally different operating temperatures of both detectors makes measurement less accurate.

In another method for compensating for ambient temperature variation, the same radiation detector for the object target, measures infrared radiation from a reference target of known temperature. Such an approach is covered, for example by the above cited U.S. Pat. Nos. 4,797,840, 4,602,642 and by U.S. Pat. No. 4,005,605 issued to Michael.

Other problems in measuring IR radiation include non-linearity, thermal drifts and aging of many infrared detectors. Such problems may be overcome by use of a null radiometer like that which is mentioned in U.S. Pat. No. 4,900,162 issued to Beckman et al. In that patent, temperature of a thermal radiation detector housing is actively controlled so that the base line signal from the detector is essentially equal to zero. Hence, the IR detector's own characteristics have less impact on overall accuracy.

The present invention is designed to provide an infrared thermometer which is less sensitive to variations in ambient temperature, and less susceptible to variabilities inherent in internal elements.

It is one object of the present invention to provide a symmetrical infrared sensor.

It is another object of the invention to provide an infrared thermometer with symmetrical sensor, and a thermal reference source.

Another object is to provide an infrared thermometer with symmetrical sensor, thermal reference source, and a null type radiometer.

Additional objects and advantages will become obvious from the ensuing descriptions of the invention.

Briefly, the present invention provides a radiation thermometer with a sensor that includes two thermal energy detectors, thermally insulated from one another.

The first detector is warmed up or cooled down by infrared radiation between the object and the first detector, while the second detector is shielded from radiation from the object, and is warmed up or cooled down by an internal reference temperature source.

Each detector provides a signal that is representative of the temperature of the detector.

The two detectors are brought substantially to a known temperature ratio, preferably to the same temperature, by heater/cooler means. A heater/cooler means changes the temperature of an item by exchanging thermal energy with the item.

The temperature of the target can be determined when the detectors of the sensor are in a balanced state which means, that heat received from the reference source is a known ratio to that received from the object target.

When the first detector is subjected to infrared radiation from a target, a control circuit which receives signals from the detectors operates the heating or cooling reference temperature source that brings the temperature of the second detector to the known temperature ratio with the first detector by exchange of thermal or heat energy between the heater/cooler source and the second detector. When the detectors are in balance, that is when the detector temperature ratio is established, the temperature, preferably of the reference source, is measured by a third temperature detector, and a processor which receives a signal from the third detector calculates the temperature of the object target.

BRIEF DESCRIPTION OF DRAWINGS

In order that the invention will be more fully comprehended, it will now be described, by way of example, with reference to the accompanying drawings, in which:

FIG. 1 is a schematic view of a balance radiation thermometer with a symmetrical sensor.

FIG. 2 is a schematic diagram of a controller with resistive bridge.

FIG. 3 is cross section view of a resistive thermal energy detector.

FIG. 4 is a schematic view of a radiation sensor with conductive heat balance.

DESCRIPTION OF THE PREFERRED EMBODIMENTS

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

An infrared thermometer relies on thermal radiation exchange between an object (target) and a sensor. If an object is warmer than sensor, the latter's temperature increase upon its exposure to a target. The sensor's temperature increase may be used for the target's temperature measurements.

Several conditions must be met to assure an accurate and fast sensor response. Among them are, low thermal mass for the sensor, low thermal coupling to the environment, low noise, and a predictable response. The major challenge is to increase the signal-to-noise ratio. "Signal" means the sensor's response to a target temperature while "noise" means response to other factors, such as ambient temperature or power supply drift.

One way to solve that problem is to construct a temperature measurement system a shown and described for FIG. 1.

Sensor 1 comprises thermal energy detector 2 which is supported by base 13. Sensor 1 can be exposed to infrared radiation from the object target via window 31. Thermal energy detector 4, supported by base 3, can be exposed to heater/cooler 5 via window 32. Each detector provides a signal when subjected to infrared energy. Thermal energy detector 33 is attached to heater/cooler 5 to measure the temperature of 5.

Detector 4 shielded from the object target while it is subjected to the same other thermal related influences as detector 2.

Located in housing 30, detectors 2 and 4 are separated by thermal insulator 34 to assure a very low heat exchange between them. The temperature of heater/cooler 5 is continuously monitored by detector 33.

Heater/cooler 5 may be adapted to have emissive characteristics close to those of a target in the wavelength of interest. Controller 12 has the function of bringing the first and second detectors 2 and 4 into a balanced state. When the detectors are balanced by controller 12, the output signal from third detector 33 can be used by processor 8 to calculate the temperature of the object target. One major advantage of this arrangement is the ability to make the sensor fully symmetrical which contributes to the rejection of thermal and electrical interferences.

Output signals from both thermal energy detectors 2 and 4 are channeled via lines 6 and 7 to controller 12, the function of which is to compare those responses from detectors 2 and 4 and to control heater/cooler 5 via lines 10 and 11. The signal from line 40 is fed into processor 8 for deriving a numerical value which appears as output 9. It is representative of the object target temperature.

A signal is received by the controller from thermal energy detector 2 via line 6. The controller's function is to bring the temperature of thermal energy detector 4 to a predetermined ratio to that of detector 2, preferably to the same temperature as detector 2. When the predetermined balance between the two temperatures are reached, the signal in line 40 can be used by processor 8 calculate the temperature of the object target.

FIG. 2 shows a typical controller/heater circuit which may be used in the present invention. A resistive bridge is formed by constant resistors 24 and 25, and thermistor detectors 2 and 4. Thermistor 2 receives heat energy from the object target, while thermistor 4 receives heat energy from heater 5.

Power is supplied to the bridge by power supply bus 29. Amplifier 26 delivers signal differentials to compensating network 27 which controls power to heater 5 for delivering sufficient heat to thermistor 4 to bring it into in proper temperature balance with thermistor 2.

Calculation of the temperature of the object can be based on one of conventional algorithms, for example, on the Stefan-Boltzmann law, and must include such factors as energy loss from optical components, emissivities of the targets and detectors, etc. It should be noted that contrary to the above cited U.S. Pat. No. 4,900,162 which essentially requires zero output signal from the radiation detector, temperature measurement according to the present invention is based on the balanced state of two parts of the sensor whatever signal values from these parts might be.

The temperature measurement system will now be described in terms of a predetermined ratio of 1 to 1 or unity. That is, detector 4 is kept at the same temperature as detector 2.

Initially, when no infrared radiation enters sensor 1, the temperatures of all internal parts of the sensor are in equilibrium and thermal energy detectors 2 and 4 generate substantially equal signals. These signals a fed into controller 12 which generates no signal change in lines 10 and 11. Output line 9 provides a signal related to the thermometer's internal temperature.

When thermal energy detector 2 is subjected to object target infrared radiation, its temperature changes. This results in a signal change in line 6. The signal is compared with a signal in line 7 which, at this moment, remains substantially unchanged. The comparison is done by controller 12. In response, it generates electric current in lines 10 and 11 to increase or decrease the temperature of heater/cooler 5. With heater/cooler 5 exposure to thermal energy detector 4, the selection of temperature change in 4 cause further signal change in line 7.

Controller 12 regulates the current in lines 10 and 11 in such a manner as to bring the signals in lines 6 and 7 as close as possible to one another.

Detector 33 monitors the temperature of heater/cooler 5, and provides a signal that is indicative of the temperature to processor 8 by way of line 40.

When the signals in lines 6 and 7 are about equal, temperature processor 8 uses the signal from detector 33 in calculating the temperature of the object target and presents it in output line 9. In other words, a temperature balance of detectors 2 and 4 is required to complete the measurement.

It may be preferred that the predetermined ratio be other than unity. For example. detector 4 may be kept at temperatures 30 degrees F.above detector 2, so that heater/cooler 5 need be only a heater to maintain the ratio, even if detector 2 is exposed to an object target that is below the temperature of sensor 1.

Various types of thermal infrared radiation detectors can be used in the thermometer shown in FIG. 1. For example, detectors 2 and 4 can be thermopiles. Alternatively, two identical detectors like the one shown in FIG. 3 can be used.

To further enhance sensor speed, active infrared detectors, like those described in U.S. Pat. No. 4,854,730 can be used.

A thermistor, semiconductor, thermocouple, RTD or any other appropriate temperature sensor can be used for detector 33.

Since the front end of an infrared thermometer is usually protected by a window 31, having an appropriate transmittance band, window 32 may be identical in order to match the thermal loss of window 31.

In applications such as medical, where the thermometer measures temperatures above ambient, heater/cooler 5 can be resistive heater. In a thermometer with a broader temperature range, heater/cooler 5 may incorporate a thermoelectric device operating on Peltier effect so that it may heat or cool detector 4.

FIG. 3 shows one example of a detector 2 constructed according to the present invention. Frame 16 supports thin substrate 17 having preferably a high thermal conductivity and a low thermal capacity. Front surface 19 carries a thin film temperature sensitive resistor (thermistor) 18 which can be connected to an external circuit via first contact 14 and second contact 15. Front surface 19 can be given an infrared absorptive coating, such as lampblack, to increase its emissivity over a spectral range of interest. When surface 19 is subjected to radiation, the temperature of substrate 17 changes. This results in corresponding change in resistance of thermistor 18.

Another method to provide thermal exchange between heater/cooler 5 and detector 4 is by means of thermal conduction, as shown in FIG. 4. The sensor is analogous to that of FIG. 1, except that elements 4, 5, and 33 are in intimate thermal contact. This assures that thermal energy is transferred between elements 4, 5, and 33 by conduction.

The thermal conductor method allows use of a substantially broader range of detectors for this invention. For example, detectors 2 and 4 may be respectively "cold" and "hot" junctions of a single thermopile detector which is a sensor of choice in many infrared thermometers.

The order of positioning of elements 4, 5, and 33 as it is shown in FIG. 4 is not critical. Insulation 34 assures that there is minimal thermal exchange between them and detector 2.

Although the invention has been described in terms of specific preferred embodiments, it will be obvious to one skilled in the art that various modifications and substitutions are contemplated by the invention disclosed herein and that all such modifications and substitutions are included within the scope of the invention and as defined in the appended claims.

What is claimed is:

1. In an apparatus for measuring the temperature of an object by receiving thermal radiation from said object, a thermal sensor comprising:
   a first means for detecting thermal energy and providing a first signal representative of the temperature of said first means, said first means for detecting being adapted for receiving thermal radiation energy from said object,
   a second means for detecting thermal energy and providing a second signal representative of the temperature of said second means,
   thermal insulation means between said second means for detecting and said first means for detecting for insulating against transfer of thermal energy between them, and
   said thermal insulation means, adapted for insulating said second means for detecting against receiving said thermal energy from said object,
   electrically operated means for changing temperature, adapted for exchanging thermal energy with said second means for detecting, and,
   said thermal insulation means adapted for insulating against transfer of thermal energy between said means for changing and said first means for detecting,
   control means, connected to said first means for detecting and to said second means for detecting for receiving said first and second signals, and connected to said means for changing for controlling said means for changing,
   said control means being for controlling the temperature of said second detector by means for changing until said second signal is in a predetermined ratio with said first signal.

2. The apparatus for measuring the temperature of an object by receiving thermal radiation from said object as described in claim 1, said apparatus further comprising:
   a third means for detecting the temperature of an item and for providing a signal representative of that temperature, connected to said means for changing, for providing a third signal representative of the temperature of said means for changing.

3. The apparatus as described in claim 2 further comprising:
   signal processor means, connected to said third means for detecting, for receiving said third signal and for providing a signal indicative of the temperature of said object.

4. The apparatus for measuring the temperature of an object by receiving thermal radiation from said object as described in claim 1, said apparatus further comprising:
   said means for changing comprising electrically driven heating means.

5. The apparatus for measuring the temperature of an object by receiving thermal radiation from said object as described in claim 1, said apparatus further comprising:
   said means for changing comprising thermoelectric means based on the Peltier effect.

6. A method for measuring the temperature of an object, said method comprising:
   exchanging thermal energy with said object by a first detector that provides a first signal representative of the temperature of said first detector, and
   exchanging thermal energy between electrically operated means for changing temperature of an item by exchanging thermal radiation with the item, and a second detector, said second detector and said means for changing being thermally insulated from the first detector, said second detector provides a second signal representative of the temperature of said second detector, until said second signal is brought to a predetermined ratio with said first signal, and
   measuring the temperature of said means for changing when the predetermined ratio is attained, and in considering the temperature of the means for changing in calculating, providing a signal indicative of the temperature of the object.

* * * * *